US008583733B2

(12) United States Patent
Faisal et al.

(10) Patent No.: US 8,583,733 B2
(45) Date of Patent: Nov. 12, 2013

(54) REAL TIME COLLABORATION FILE FORMAT FOR UNIFIED COMMUNICATION

(75) Inventors: Adil Faisal, Redmond, WA (US); Aaron C. Sethi, Bellevue, WA (US); Ken Wolfe, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 801 days.

(21) Appl. No.: 11/840,450

(22) Filed: Aug. 17, 2007

(65) Prior Publication Data

US 2009/0049129 A1 Feb. 19, 2009

(51) Int. Cl.
*H04M 3/56* (2006.01)
*G06F 15/16* (2006.01)

(52) U.S. Cl.
USPC ........ 709/204; 379/88.17; 379/900; 707/201; 715/513

(58) Field of Classification Search
USPC .......................................................... 709/204
See application file for complete search history.

(56) References Cited

U.S. PATENT DOCUMENTS

| 6,078,948 | A * | 6/2000 | Podgorny et al. ............. 709/204 |
| 6,205,209 | B1 * | 3/2001 | Goldberg et al. .......... 379/93.15 |
| 6,310,941 | B1 * | 10/2001 | Crutcher et al. ........... 379/88.17 |
| 6,968,346 | B2 | 11/2005 | Hekmatpour |
| 7,065,706 | B1 | 6/2006 | Sankar |
| 7,296,023 | B2 * | 11/2007 | Geyer et al. ............................ 1/1 |
| 8,095,665 | B1 * | 1/2012 | Bau ................................ 709/227 |
| 2002/0077986 | A1 * | 6/2002 | Kobata et al. ................... 705/52 |
| 2002/0087592 | A1 | 7/2002 | Ghani |
| 2002/0141404 | A1 | 10/2002 | Wengrovitz et al. |
| 2002/0143944 | A1 * | 10/2002 | Traversat et al. ............. 709/225 |
| 2003/0009536 | A1 * | 1/2003 | Henderson et al. ........... 709/219 |
| 2003/0018719 | A1 * | 1/2003 | Ruths et al. .................... 709/205 |
| 2003/0101283 | A1 * | 5/2003 | Lewis et al. ................... 709/246 |
| 2003/0145054 | A1 * | 7/2003 | Dyke ............................. 709/205 |
| 2003/0145315 | A1 * | 7/2003 | Aro et al. ....................... 717/170 |
| 2004/0039827 | A1 * | 2/2004 | Thomas et al. ............... 709/228 |
| 2004/0117428 | A1 | 6/2004 | Surma et al. |
| 2004/0210756 | A1 * | 10/2004 | Mowers et al. ............... 713/168 |
| 2005/0060371 | A1 * | 3/2005 | Cohen et al. .................. 709/205 |
| 2005/0086384 | A1 * | 4/2005 | Ernst ............................. 709/248 |
| 2005/0089023 | A1 * | 4/2005 | Barkley et al. ................ 370/352 |
| 2005/0091435 | A1 | 4/2005 | Han et al. |
| 2005/0097169 | A1 * | 5/2005 | Mukherjee et al. ........... 709/204 |
| 2005/0165859 | A1 * | 7/2005 | Geyer et al. ................... 707/201 |
| 2005/0256825 | A1 * | 11/2005 | Dettinger et al. ................. 707/1 |
| 2006/0010241 | A1 | 1/2006 | Kudallur et al. |

(Continued)

OTHER PUBLICATIONS

Riemer, et al. "Presence-based, Context-sensitive Real Time Collaboration (RTC)—Research Directions for a New Type of eCollaboration System" (2006) Proceedings of the 19th Bled eConference, 16 pages.

(Continued)

*Primary Examiner* — Andrew Goldberg (57) ABSTRACT

The claimed subject matter provides a system and/or a method that facilitates enhancing real time unified communications. An interface can receive a portion of data associated with at least one of a client application or an environment that hosts a client application. A real time collaboration (RTC) component can employ an RTC file package to seamlessly initiate a real time collaboration session with the client application, wherein the RTC file package can include a portion of data that relates to at least one of the client application, the host environment, or a modality of the client application.

19 Claims, 10 Drawing Sheets

(56) References Cited

U.S. PATENT DOCUMENTS

| | | |
|---|---|---|
| 2006/0112188 A1 | 5/2006 | Albanese et al. |
| 2006/0143318 A1* | 6/2006 | Prajapat et al. ............ 710/8 |
| 2006/0173959 A1* | 8/2006 | McKelvie et al. ........ 709/204 |
| 2006/0282767 A1* | 12/2006 | Suryanarayana et al. .... 715/513 |
| 2008/0155104 A1* | 6/2008 | Quinn et al. ........... 709/227 |
| 2008/0162551 A1* | 7/2008 | Geyer et al. ........... 707/103 R |
| 2008/0178169 A1* | 7/2008 | Grossner et al. ........ 717/170 |
| 2009/0006553 A1* | 1/2009 | Grandhi ............... 709/205 |

OTHER PUBLICATIONS

Exchange 2000 Server—Real Time Collaboration http://www.microsoft.com/technet/prodtechnol/exchange/2000/library/reskit/resguide/c32rtc.mpx?mfr=true last viewed Mar. 22, 2007, 15 pages.

* cited by examiner

REAL TIME COLLABORATION FILE FORMAT FOR UNIFIED COMMUNICATION

CROSS REFERENCE TO RELATED APPLICATION(S)

This application relates to U.S. application Ser. No. 11/081,806, entitled, "Method and System for Installing Applications via a Display Page," filed Mar. 15, 2005.

BACKGROUND

As computing and network technologies have evolved and have become more robust, secure and reliable, more consumers, wholesalers, retailers, entrepreneurs, educational institutions, and the like have and are shifting business paradigms and are employing the Internet to perform business rather than utilizing traditional means. For example, today consumers can access their bank accounts on-line (e.g., via the Internet) and can perform an ever growing number of banking transactions such as balance inquiries, fund transfers, bill payments, and the like.

With the tightening of browser and operating system security, it has become increasingly more difficult to detect and launch client applications from browsers with minimal user intervention. To exacerbate matters users can encounter significantly disparate experiences depending on operating system and/or browser security settings. Conventionally, the detection and launch of client applications has involved a combination of nonstandard approaches, such as browser plug-ins, ActiveX, signed Java Applets, etc. to obtain users consent to run client applications on their machines. While such nonstandard approaches may have achieved their ends, such approaches elicited a multitude of additional security dialogs generated by the operating system and/or browser making a user's experience extremely unpleasant, tedious, and daunting. Additionally, conventional means of detecting and launching client applications can significantly compromise computer, operating system, and/or browsers security (e.g., installing ActiveX control, even from trust sources, can open up possibilities for malicious sites to exploit any security holes that might exist in the ActiveX control).

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a real time collaboration session utilizing an RTC file package. A real time collaboration (RTC) component can receive and/or collect a portion of data related to a client application for real time communication and/or a host environment for the client application, wherein the portion of data can be incorporated into an RTC file package to seamlessly enable real time communications between two or more clients or a client and a server. The RTC file package can include data that defines which client application to utilize for real time communication, a modality for the real time communication, and/or at least one input parameter utilized by the client application for real time communication. With the implementation of the RTC file package, the RTC component can initiate a real time collaborative session between two or more clients (or a client and a server) independent of versioning conflicts, host environment disparities, and/or input parameter requirements. Thus, the RTC file package can include streamlined data necessary for a real time collaboration to be executed.

The RTC component can utilize a signature component that can incorporate a signature and/or security mechanism into the RTC file package. Such signature and/or security mechanism can be utilized to authenticate and/or verify an origin for the RTC file package. Thus, an RTC file package associated with a user and/or a session can be validated prior to utilizing the RTC file package to initiate the real time collaboration. Moreover, the RTC file package can be an agnostic flexible file format that can invoke a family of applications utilized for real time communications. In other aspects of the claimed subject matter, methods are provided that facilitate creating an RTC file package associated with at least one client application and respective environment.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

As utilized herein, terms "component," "package," "interface," "server," "data store," "browser," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Figure 1:
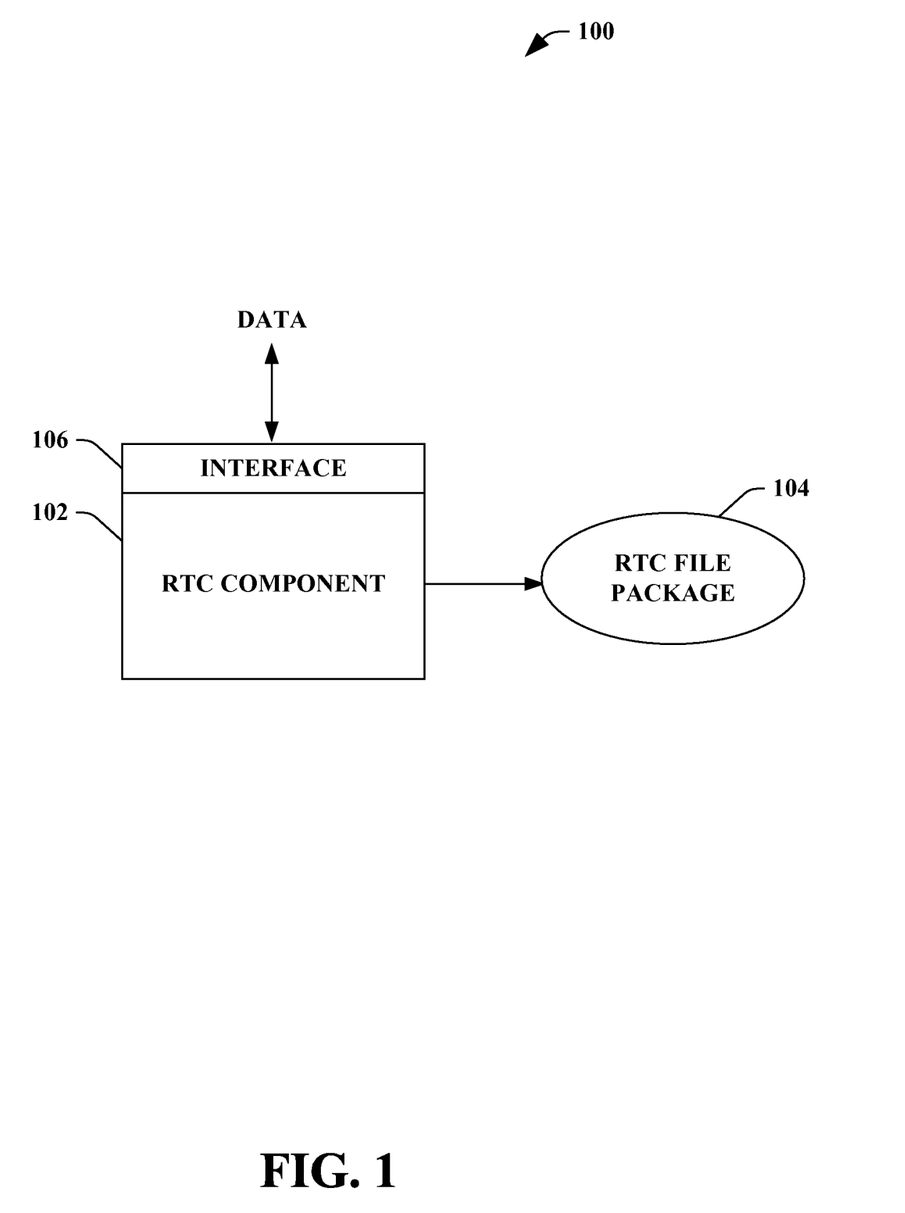
FIG. 1 illustrates a block diagram of an exemplary system that facilitates employing a real time collaboration session utilizing an RTC file package.

Now turning to the figures, FIG. 1 illustrates a system 100 that facilitates employing a real time collaboration session utilizing an RTC file package. The system 100 can utilize an agnostic file format and/or file package, such as an RTC file package 104, in order to initiate and employ a real time collaboration session between at least two or more clients independent of versions for client application(s). The system 100 can include a real time collaboration (RTC) component 102 that can receive a portion of data via an interface component 106 (discussed below) in order to create the RTC file package 104. In particular, the portion of data received by the RTC component 102 can relate to a client application, an environment that hosts the client application, and/or any other suitable data related to a client application. Such portion of data received can be incorporated into the RTC file package 104, wherein the RTC file package 104 can be utilized to seamlessly enable a real time collaboration session. In general, the RTC component 102 can create the RTC file package 104 to facilitate implementing a real time collaboration session with a client application between two or more clients independent of versioning issues between such client applications. Thus, the RTC component 102 can employ real time collaborations with disparate versions of client applications in a seamless manner by utilizing the RTC file package 104.

For example, various client applications with differing versions can be utilized for real time collaboration sessions. Thus, difficulties can arise with implementing real time collaboration between a first client having a first version of a client application and a second client with a second version of the similar client application. For instance, a video conferencing application can include numerous versions and/or firmware upgrades with respective compatibility issues. Furthermore, each client can include specific environments and/or operating systems. Generally, the RTC component 102 can employ real time collaboration sessions across varying/disparate host environments (e.g., machines, computers, operating systems, hardware, etc.) and/or client application versions. Thus, by utilizing the RTC file package 104 seamless real time collaboration sessions between various versions and/or environments can be allowed.

The RTC component 102 can be utilized with a plurality of client applications, wherein the client applications can be any suitable application or software related to real time communications for collaboration between two or more clients. As discussed, the client applications can include numerous versions and can be hosted by a plurality of host environments (e.g., machines, computers, local locations, remote locations, operating environments, operating systems, etc.). Furthermore, the client application(s) can receive various types of input parameters, wherein such input parameters can be further included in the RTC file package 104. It is to be appreciated that the client application can be any suitable client application that can employ real time communications and/or collaborations via the Internet between two or more clients. For example, the client application can provide real time collaboration sessions for various modalities such as, but not limited to, audio communications, video communications, voice over Internet protocol (VoIP) communications, instant messaging communications, desktop sharing communications, file sharing communications, etc.

In one example, the system 100 can utilize the RTC file package 104 to invoke any suitable client application through multipurpose Internet mail Extension (MIME) association and remain true to a vision of unified communication (e.g., by employing the RTC file package 104 as an agnostic file format to implement for real time communication). The RTC component 102 can utilize the RTC file package 104 to invoke a corresponding client application with a correct behavior/modality based on the specifics of thereof. Moreover, the RTC file package 104 can include any suitable input parameters associated with the client application. For example, the RTC file package 104 can specify the modality of the communication based on defining the client application for real time collaboration, wherein such modality can be at least one of launch chat application for chat, launch video conferring application for video meeting, launch application sharing software for application sharing, etc.

In addition, the system 100 can include any suitable and/or necessary interface component 106 (herein referred to as "interface 106"), which provides various adapters, connectors, channels, communication paths, etc. to integrate the RTC component 102 into virtually any operating and/or database system(s) and/or with one another. In addition, the interface 106 can provide various adapters, connectors, channels, communication paths, etc., that provide for interaction with the RTC component 102, RTC file package 104 and any other device and/or component associated with the system 100.

Figure 2:
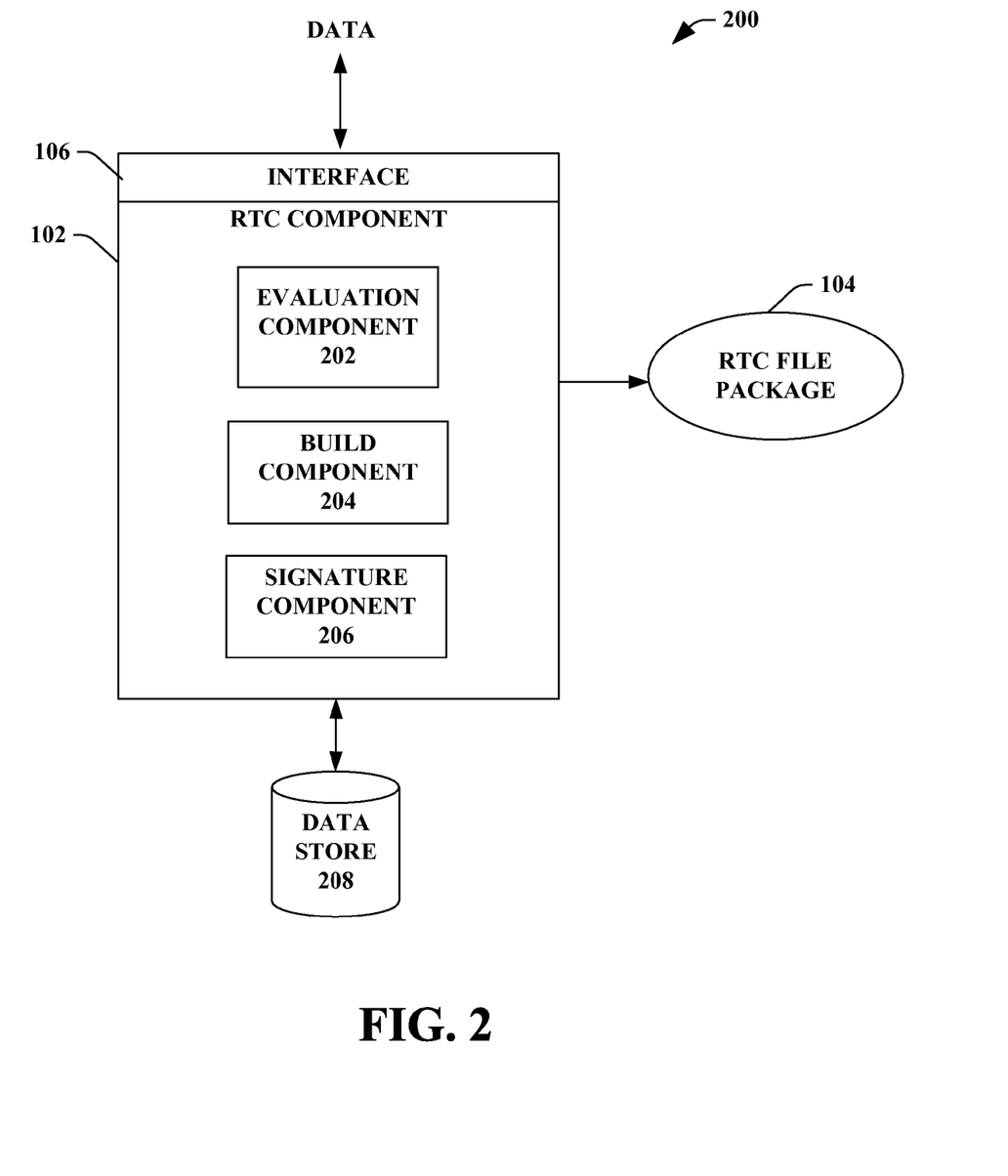
FIG. 2 illustrates a block diagram of an exemplary system that facilitates creating an RTC file package associated with at least one client application and respective environment.

FIG. 2 illustrates a system 200 that facilitates creating an RTC file package associated with at least one client application and respective environment. The system 200 can include the RTC component 102 that can employ the RTC file package 104 that specifies definitions and/or signatures related to client applications and/or environments to facilitate seamless real time collaborating. The RTC file package 104 can define at least one of a client application, a client application version, an environment related to a client application, a modality associated with a client application, at least one input parameter related to the client application, and/or any other suitable data that can be utilized to implement the client application. In general, the RTC file package 104 can be an application agnostic flexible portion of collected data that can invoke a family of real time collaboration applications (e.g., client applications). The RTC file package 104 can further facilitate routing of inputs. In particular, the RTC component 102 can utilize MIME association with the RTC file package 104 to enable application agnostic routing. The RTC file package 104 can further include data to identify a client application to launch and to perform an intended purpose (e.g., initiate a chat, utilize a video conference, etc.).

The RTC component 102 can utilize an evaluation component 202 that can collect client specific data to create the RTC file package 104. For example, the evaluation component 202 can evaluate existing client applications associated with a client, an environment associated with a client (e.g., an operating system, a computer, input devices, display devices, graphic cards, memory, processor, etc.), a client preference (e.g., available client application listing, security preference, digital signature details, communication settings, collaboration preferences, optimal and/or default settings, etc.), a versioning associated with a client application, a hardware/software configuration, input parameters associated with a particular client application, and/or any other data related to the system 200. For instance, the evaluation component 202 can identify and/or collect data to enable the RTC file package 104 to a) invoke a particular application from a family of client applications related to real time collaboration and/or b) automatic routing of the data associated with the client application.

The gathered information from the evaluation component 202 can be utilized by a build component 204 to generate the RTC file package 104 accordingly. In other words, the build component 204 can create the RTC file package 104 based at least in part upon the specific details collected from the evaluation component 202. Therefore, each client with particular client applications, client application versions, hosting environments, etc. can include client-specific RTC file packages in order to facilitate seamless employment of real time collaboration sessions. The build component 204 can create the RTC file package 104 to include information that identifies which client application to launch and/or utilize for a real time collaboration session. Moreover, the build component 204 can compose the RTC file package 104 with information for the identified application to perform a desired purpose and/or functionality. For example, the build component 204 can create the RTC file package 104 to include information that defines a particular client application to employ, and any additional information necessary for the client application to perform and/or be utilized (e.g., input parameters, settings configurations, client information, invitee information, etc.).

The RTC component 102 can also utilize a signature component 206 that can include a signature for the RTC file package 104 in order to validate its origin. The signature component 206 can incorporate a security mechanism such as a signature for the RTC file package 104 in order to ensure integrity and/or origin which defer possible malicious input attempts. The signature component 206 can provide verifiability of RTC file package 104 origin. For example, a first RTC file package can be created based upon evaluating client A's environment and/or client applications. The signature component 206 can incorporate a signature for the first RTC file package in order to ensure integrity and origin of such real time collaboration definition data (e.g., the RTC file package). In particular, the signature component 206 can incorporate information for a router (not shown) to validate its origin prior to passing the package to a target application. In another example, the signature of the RTC file package can be validated by a server (not shown), the RTC component 102, a browser (not shown), and/or any other suitable component and/or device that can validate the origin of data.

The system 200 can further include a data store 208 that can include any suitable data related to the RTC component 102, RTC file package 104, the interface 106, the evaluation component 202, the build component 204, the signature component 206, etc. For example, the data store 208 can include, but not limited to including, client applications, client application versioning data, client settings, client preferences, client application listings, real time collaboration preferences, client environments, host environments, server settings, browser settings, a portion of the RTC file package 104, a plurality of RTC file packages, data collected and/or gathered from the evaluation component 202, RTC file package build data, signature data, origin data, and/or any other suitable data related to the generation of the RTC file package 104 and/or employment of a real time collaboration session.

It is to be appreciated that the data store 208 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 208 of the subject systems and methods is intended to comprise, without being limited to, these and any other suitable types of memory. In addition, it is to be appreciated that the data store 208 can be a server, a database, a hard drive, a pen drive, an external hard drive, a portable hard drive, and the like.

Figure 3:
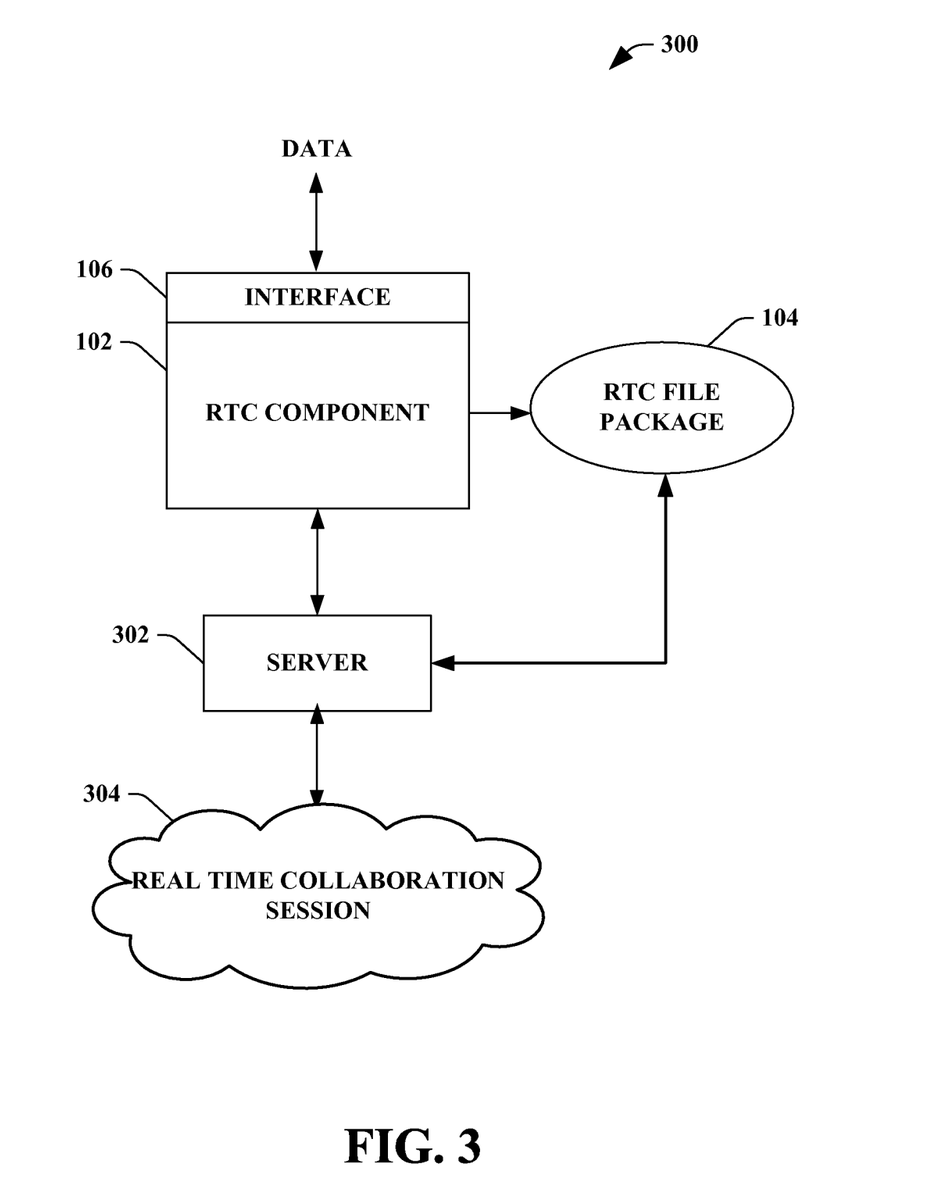
FIG. 3 illustrates a block diagram of an exemplary system that facilitates employing an RTC file package to seamlessly communicate with a server for real time collaboration session.

FIG. 3 illustrates a system 300 that facilitates employing an RTC file package to seamlessly communicate with a server for real time collaboration session. The system 300 can include the RTC component 102 that can enable seamless implementation of real time collaboration between two or more clients utilizing the RTC file package 104. As discussed, the RTC component 102 can create the RTC file package 104 which can define a client application to employ for real time collaboration, a type of modality and/or functionality to employ for the real time collaboration (e.g., based upon the client application defined, audio, video, instant messaging, etc.), and various versioning information related to the client application and/or environment.

The RTC file package 104 can be utilized by a server 302 to initiate a real time collaboration session 304. In particular, the server 302 can receive the RTC file package 104 to identify at least one of a client application to utilize for the real time collaboration session, a versioning associated with the client application, an input parameter associated with the client application identified, and/or a particular modality to utilize for the real time collaboration. By utilizing the RTC file package 104, the server 302 can enable a seamless interaction between numerous clients within the real time collaboration session 304 utilizing each client's respective RTC file package of data. For example, user A can initiate a real time collaboration with user B, wherein each user can include corresponding RTC file package data that can be utilized by the server 302 for compatibility and seamless employment of the real time collaboration session 304. In other words, the RTC file package for each participant within the real time collaboration session 304 can provide any suitable data (e.g., client application type, modality of collaboration, input parameters for the collaboration, invitee information, validity of RTC file package origin, etc.) regardless of disparate versions, environments, locations, etc. of participants.

For example the RTC file package 104 can be utilized by a client application that enables live conferencing with real time audio, video, instant messaging, etc. The RTC file package 104 can include at least a portion of the following data in order to employ a real time collaboration:

```
<Param authPasword ="" />
<Param authTicket ="" />
<Param authUserName ="" />
<Param customAiccSid ="" />
<Param customExtra1 ="" />
<Param customExtra2 ="" />
<Param customExtra3 ="" />
<Param customSource ="" />
<Param isLobby = ""/>
<Param role = ""/>
<Param meetingEndTime ="" />
<Param meetingID ="" />
<Param meetingPassword ="" />
<Param meetingStartTime ="" />
<Param meetingSubject ="" />
<Param recordingAgreement ="" />
<Param startURI ="" />
<Param userCompany ="" />
<Param userDisplayName ="" />
<Param userEmail ="" />
```

Moreover, it is to be appreciated that there can be various versions of the RTC file package 104 included within itself in order to universally applicable for real time collaborations. For instance, the RTC file package 104 can include an extensible markup language (XML) version as a cue for an XML parser (not shown) used by a router and/or an application. The RTC file package 104 can further include a version as a cure for supportability for a router. In another example, the RTC file package 104 can include a server version as a cure for a router to pick up a target application in case of multiple versions of the application residing side-by-side. Additionally, the RTC file package 104 can include a server authentication ticket as a technique to allow a router to "call home" and verify the integrity of the originating server. Furthermore, the RTC file package 104 can include a modality as a cue for a router to pick up and/or launch an application that can handle a desired real time communication mode (e.g., audio, video, chat, instant messaging, etc.).

Figure 4:
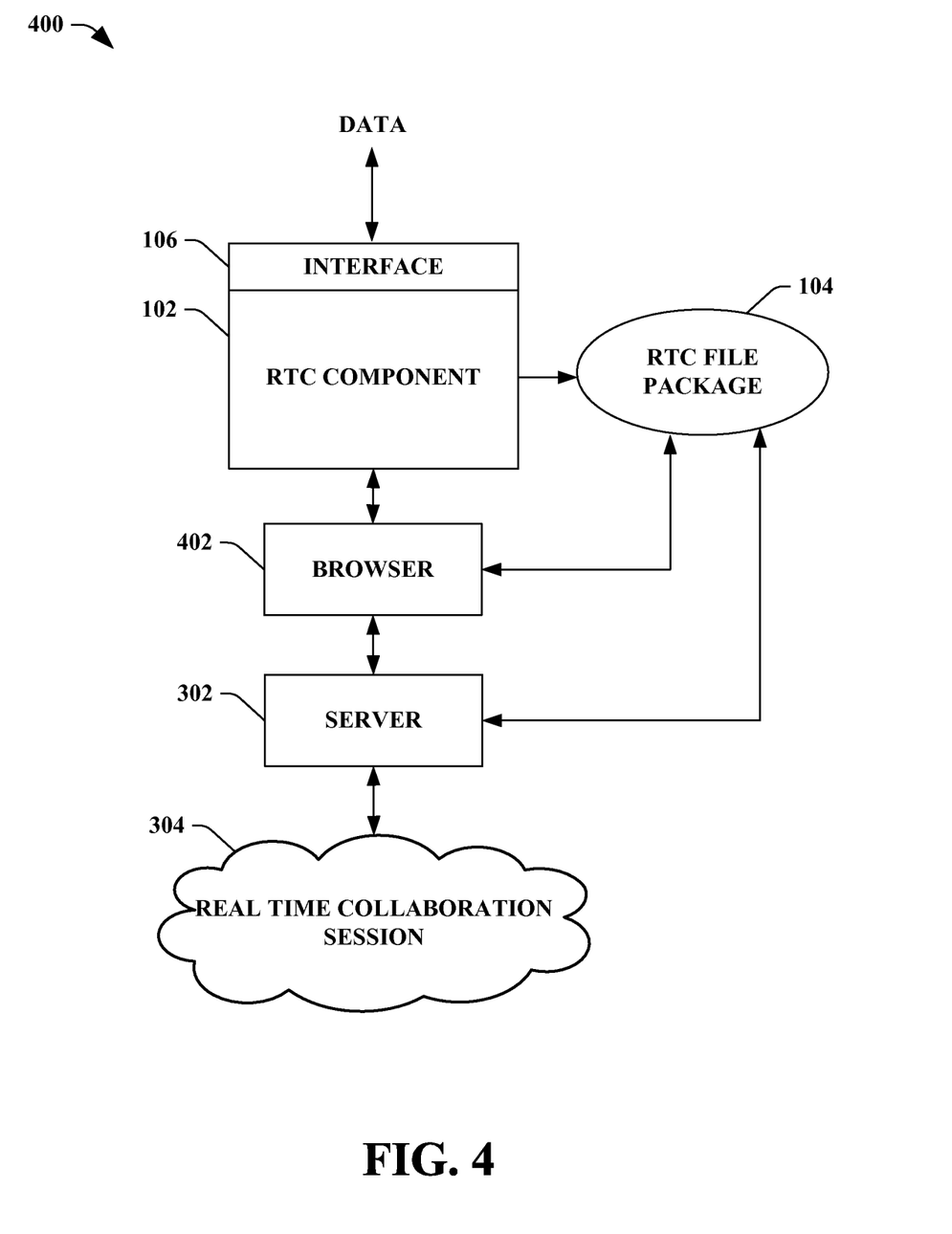
FIG. 4 illustrates a block diagram of an exemplary system that facilitates implementing an RTC file package to seamlessly communicate with a server for real time collaboration session via a browser.

FIG. 4 illustrates a system 400 that facilitates implementing an RTC file package to seamlessly communicate with a server for real time collaboration session via a browser. The system 400 mitigates complications associated with employing a real time communication and/or collaboration between clients with differing versions of real time collaboration client applications. The system 400 can include the RTC component 102 that can receive data via the interface 106 in order to generate the RTC file package 104 which includes client application identifying data, client application versioning data, environment specifying data, input parameters data, modality defining data, and/or any other suitable data that can be utilized to implement a real time collaboration. In general, it is to be appreciated that the RTC file package 104 can enhance online collaboration between clients by providing an agnostic file package that is flexible with sufficient data to employ real time communications.

The RTC file package 104 can be utilized by a browser 402 to employ the real time collaboration session 304 via the server 302. For example, the browser 402 can be any suitable browsing application and/or software that can enable interaction and/or display of text, images, and/or other information located on a website, the Internet, the World Wide Web, and/or a local area network. The browser 402 can utilize the RTC file package 104 in order to identify a client application to launch for real time communications, a modality associated with the real time communication, input parameters for the real time communication, and/or a signature and/or verification of the RTC file package 104 origin. With the agnostic and flexible RTC file package 104, the real time collaboration session 304 can be utilized independent of file format, application versioning, and/or environment characteristics for each client. The browser 402 can further utilize the server 302 to initiate the real time collaboration session 304.

Figure 5:
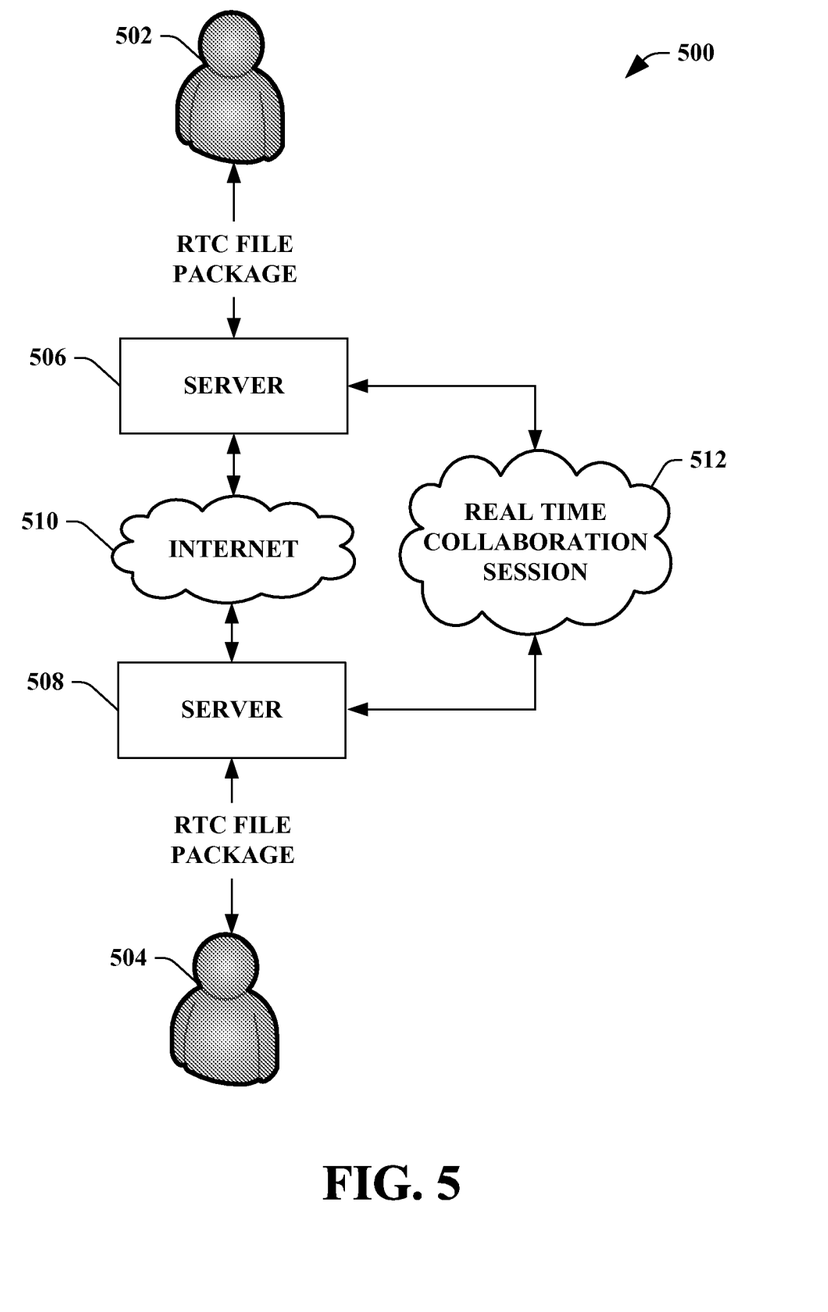
FIG. 5 illustrates a block diagram of exemplary system that facilitates providing real time communications between two or more users independent of varying client application versions.

FIG. 5 illustrates a system 500 that facilities providing real time communications between two or more users independent of varying client application versions. The system 500 illustrates an exemplary scenario involving at least one client utilizing a real time collaboration application for real time communications. It is to be appreciated that the system 500 can include the RTC component (not shown), the interface (not shown) as described in previous figures. In general, the system 500 can enable at least two clients to seamlessly participate in a real time collaboration with a particular client application regardless of the client application versions, environments, and/or various input parameters. It is to be appreciated that the system 500 is just one example of implementing the subject innovation and that there can be various nuances and/or subtleties which are intended to be included under the scope of the claimed subject matter. For example, the RTC file package can be utilized by a server (as illustrated), a browser, and/or any suitable combination thereof.

A client 502 can desire to initiate a real time communication such as a real time collaboration utilizing a client application. An RTC file package can be specifically tailored and created for the client 502. For example, the RTC file package can include data related to any available RTC client applications, input parameters for the client applications, environments hosting a client application, modalities associated with the client application for real time communication, and/or a signature validating origin and/or integrity. The client 502 can request and/or initiate a real time collaboration utilizing the RTC file package to a server 506. The RTC file package can be communicated to an intended participant such as a client 504. In response to the real time collaboration request from client 502, the client 504 can employ his/her respective RTC file package to a server 508. It is to be appreciated that the system 500 is described with client 502 and client 504 being on disparate networks. However, it is to be appreciated that if client 502 and client 504 were on a similar network, there would be a single server receiving respective RTC file package data. The server 506 and the server 508 can communicate and/or utilize the RTC file package data via the Internet 510 in order to employ a real time collaboration session 512.

Figure 6:
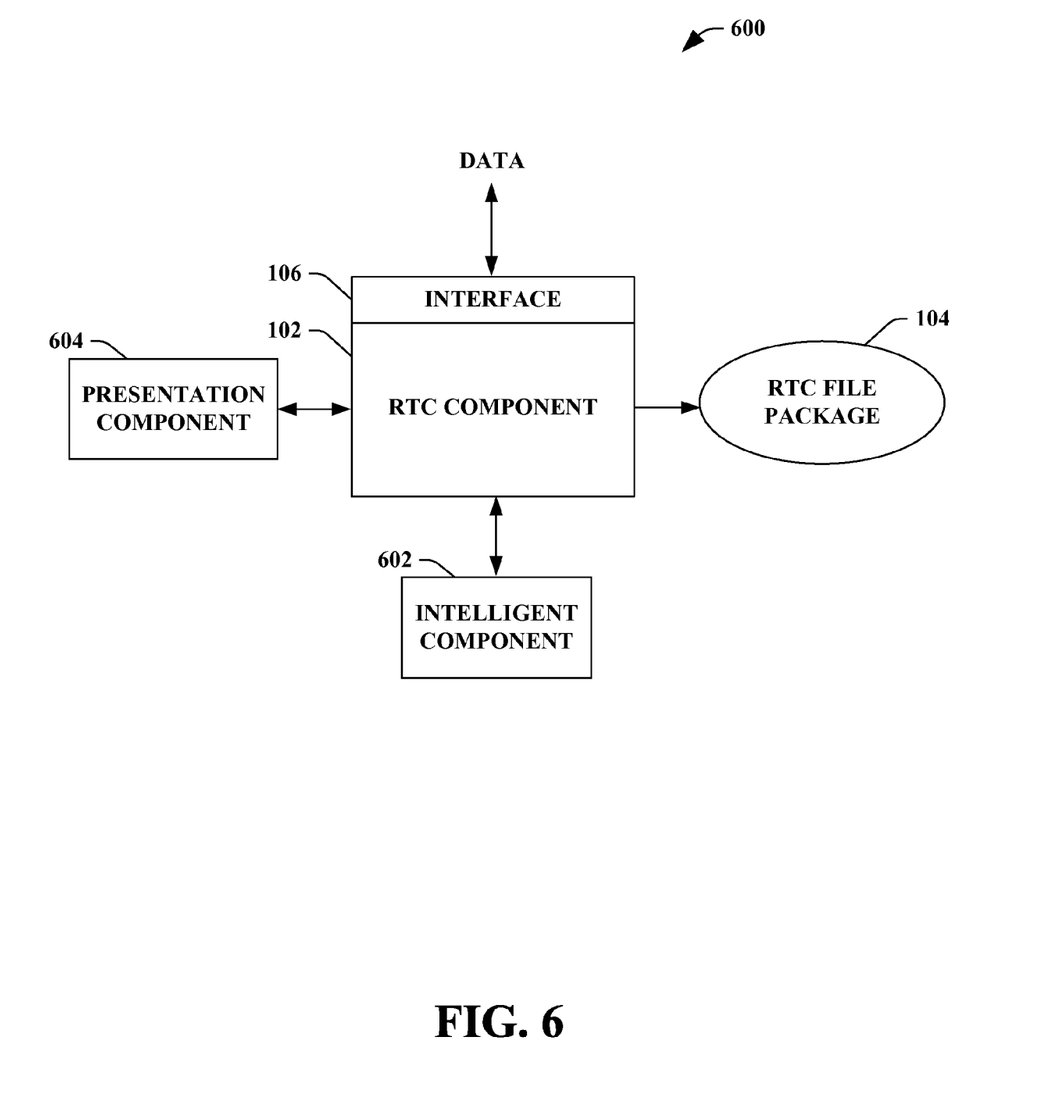
FIG. 6 illustrates a block diagram of an exemplary system that facilitates employing a real time collaboration session utilizing an RTC file package.

FIG. 6 illustrates a system 600 that employs intelligence to facilitate employing a real time collaboration session utilizing an RTC file package. Accordingly, as illustrated, system 600 can include an intelligent component 602 that can be utilized, for example, to infer RTC file package data, environment settings/characteristics, client application, client application settings, versioning with client application, real time collaboration settings/options, input parameters associated with a client application for real time collaboration, modality associated with client application, client application to launch, etc. The intelligent component 6002 can employ a probabilistic based or statistical based approach, for example, in connection with making determinations or inferences. Inferences can be based in part upon explicit training of classifiers (not shown) before employing system 600, or implicit training based at least in part upon system feedback and/or users previous actions, commands, instructions, and the like during use of the system. The intelligent component 602 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. Intelligent component 602 can factor historical data, extrinsic data, context, data content, state of the user, and can compute cost of making an incorrect determination or inference versus benefit of making a correct determination or inference. Accordingly, a utility-based analysis can be employed with providing such information to other components or taking automated action. Ranking and confidence measures can also be calculated and employed in connection with such analysis.

The RTC component 102 can further utilize a presentation component 604 that provides various types of user interfaces to facilitate interaction between a user and any component coupled to the RTC component 102. As depicted, the presentation component 604 is a separate entity that can be utilized with the RTC component 102. However, it is to be appreciated that the presentation component 604 and/or similar view components can be incorporated into the RTC component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the RTC component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
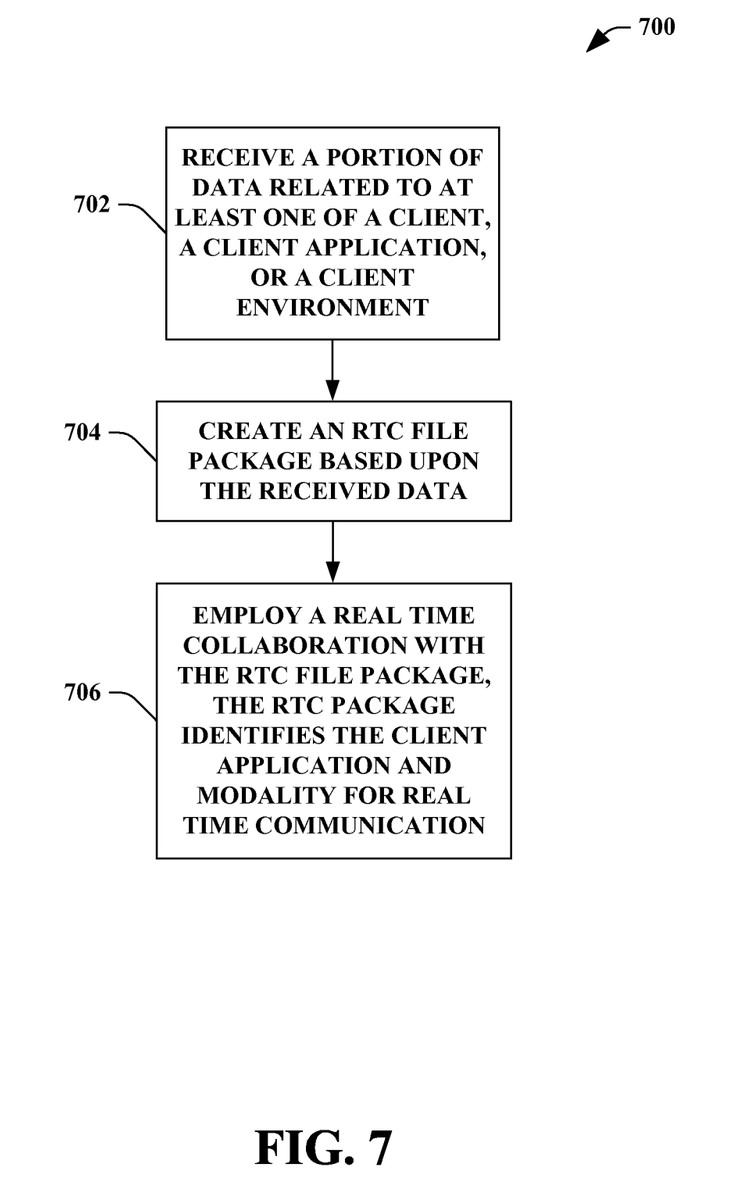
FIG. 7 illustrates an exemplary methodology for creating an RTC file package associated with at least one client application and respective environment.
Figure 8:
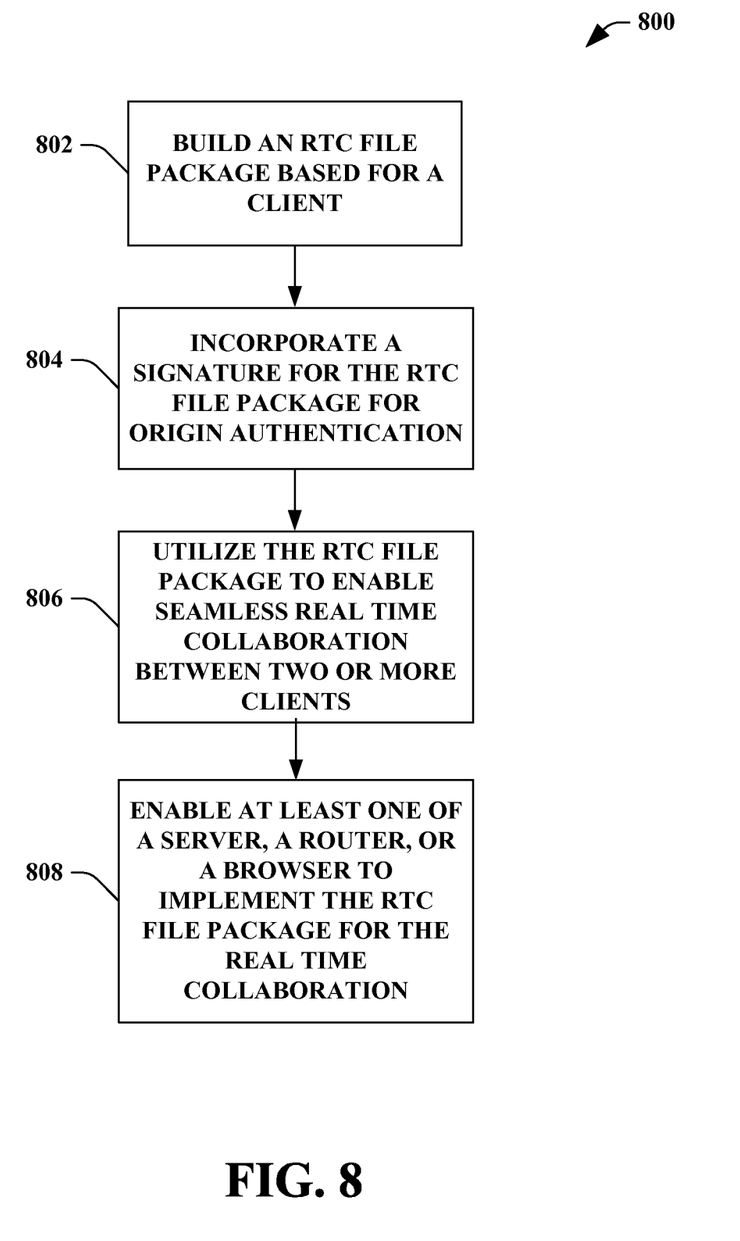
FIG. 8 illustrates an exemplary methodology that facilitates providing real time communications between two or more users independent of varying client application versions.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates creating an RTC file package associated with at least one client application and respective environment. In general, the methodology 700 can create an RTC file package that can enable real time collaboration based upon its agnostic and flexible characteristics. At reference numeral 702, a portion of data related to at least one of a client, a client application, or a client environment can be received. It is to be appreciated that the client applications can be any suitable application or software related to real time communications for collaboration between two or more clients. Thus, the client application can be any suitable client application that can employ real time communications and/or collaborations via the Internet between two or more clients. For example, the client application can provide real time collaboration sessions for various modalities such as, but not limited to, audio communications, video communications, voice over Internet protocol (VoIP) communications, instant messaging communications, desktop sharing communications, file sharing communications, etc.

At reference numeral 704, an RTC file package can be created based at least in part upon the received portions of data. The RTC file package can include data corresponding to client application, client application versioning, client application modality, client environment, input parameters associated with the client application, client application identification to launch for a real time collaboration, etc. For example, the RTC file package can be created to include information that defines a particular client application to employ, and any additional information necessary for the client application to perform and/or be utilized (e.g., input parameters, settings configurations, client information, invitee information, etc.).

At reference numeral 706, a real time collaboration can be employed with the RTC file package, wherein the RTC file package identifies the client application and modality for the real time communication. In other words, the RTC file package can include sufficient data in order to seamlessly initiate a real time collaboration utilizing a client application. For example, the RTC file package can define data such as, a client application to utilize for real time collaboration, a client application version, an environment related to a client application, a modality associated with a client application, at least one input parameter related to the client application, and/or any other suitable data that can be utilized to implement the client application for real time communication. In general, the RTC file package can be an application agnostic flexible portion of collected data that can invoke a family of real time collaboration applications (e.g., client applications).

FIG. 8 illustrates a method 800 for utilizing real time communications between two or more users independent of varying client application versions. At reference numeral 802, an RTC file package can be built for a client. For example, a client and respective client applications and/or environment can be evaluated in order to build a client-specific RTC file package. Therefore, each client with particular client applications, client application versions, hosting environments, etc. can include client-specific RTC file packages in order to facilitate seamless employment of real time collaboration sessions. For example, the following can be defined within the RTC file package: existing client applications associated with a client; an environment associated with a client (e.g., an operating system, a computer, input devices, display devices, graphic cards, memory, processor, etc.); a client preference (e.g., available client application listing, security preference, digital signature details, communication settings, collaboration preferences, optimal and/or default settings, etc.); a versioning associated with a client application; a hardware/software configuration; and/or input parameters associated with a particular client application.

At reference numeral 804, a signature can be incorporated into the RTC file package for origin authentication. The RTC file package can include the signature in order to validate origin and authenticity of the source of the RTC file package, wherein such signature ensures a particular RTC file package accurately correlates to a specific client. Therefore, prior to exposing a client to a real time communication, the RTC file package can provide a security mechanism that protects data and/or system integrity.

At reference numeral 806, the RTC file package can be utilized to enable seamless real time collaboration between two or more clients. The RTC file package can be cracked open to expose data specific to a particular real time collaboration utilizing a client application, wherein such data exposed can provide at least a portion of the following: identification of a client application to utilize for real time collaboration; an input parameter required for real time collaboration utilizing the client application; a modality suggested and/or desired for the real time collaboration; a client application to utilize based on a desired modality; and/or verification of origin utilizing a signature. At reference numeral 808, the at least one of a server, a router, or a browser can be enabled to implement the RTC file package for the real time collaboration.

Figure 9:
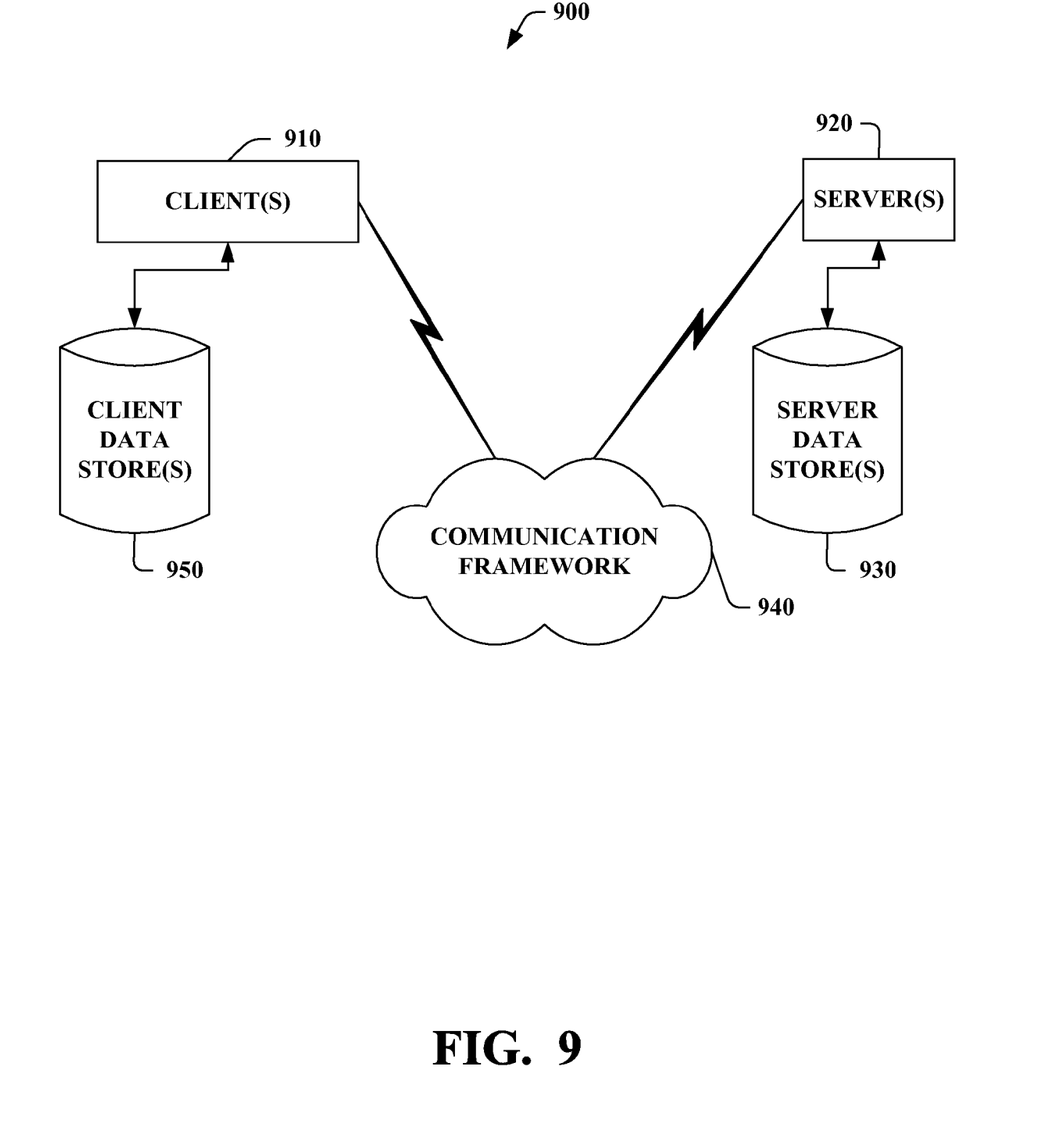
FIG. 9 illustrates an exemplary networking environment, wherein the novel aspects of the claimed subject matter can be employed.
Figure 10:
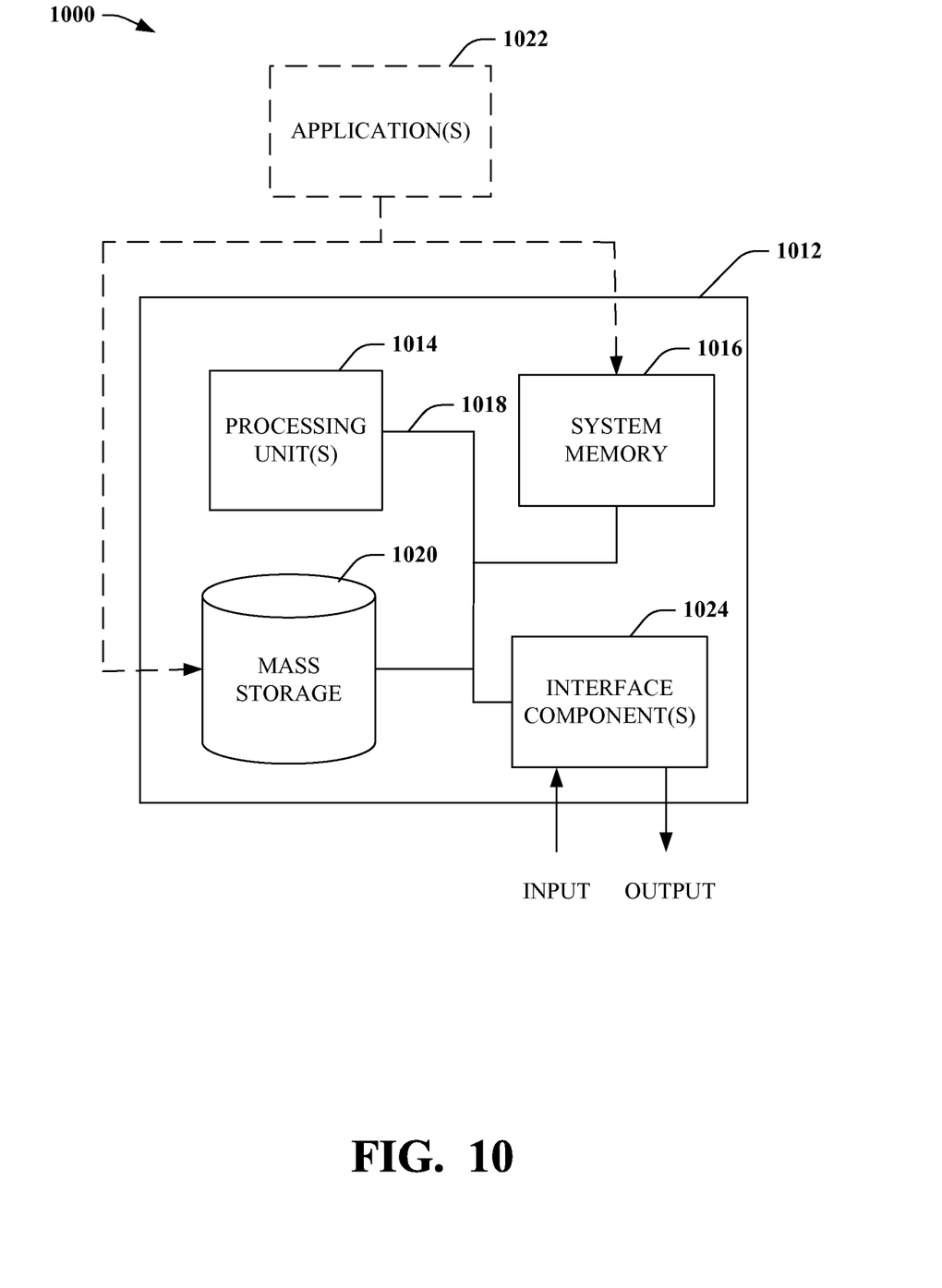
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an RTC component that facilitates employing a real time collaboration application with an RTC file package, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Referring to FIG. 9, there is illustrated a schematic block diagram of an exemplary computing environment 900 for processing the disclosed architecture in accordance with another aspect. The system 900 includes one or more client(s) 910. The client(s) 910 can be hardware and/or software (e.g., threads, processes, computing devices). The client(s) 910 can house cookie(s) and/or associated contextual information by employing the claimed subject matter, for example.

The system 900 also includes one or more server(s) 920. The server(s) 920 can also be hardware and/or software (e.g., threads, processes, computing devices). The servers 920 can house threads to perform transformations by employing the claimed subject matter, for example. One possible communication between a client 910 and a server 920 can be in the form of a data packet adapted to be transmitted between two or more computer processes. The data packet may include a cookie and/or associated contextual information, for example. The system 900 includes a communication framework 940 (e.g., a global communication network such as the Internet) that can be employed to facilitate communications between the client(s) 910 and the server(s) 920.

Communications can be facilitated via a wired (including optical fiber) and/or wireless technology. The client(s) 910 are operatively connected to one or more client data store(s) 950 that can be employed to store information local to the client(s) 910 (e.g., cookie(s) and/or associated contextual information). Similarly, the server(s) 920 are operatively connected to one or more server data store(s) 930 that can be employed to store information local to the servers 920.

With reference to FIG. 10, an exemplary environment 1000 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. It is to be appreciated that dual microprocessors, multi-core and other multiprocessor architectures can be employed as the processing unit 1014.

The system memory 1016 includes volatile and nonvolatile memory. The basic input/output system (BIOS), containing the basic routines to transfer information between elements within the computer 1012, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1012 also includes removable/non-removable, volatile/non-volatile computer storage media. FIG. 10 illustrates, for example, mass storage 1020. Mass storage 1020 includes, but is not limited to, devices like a magnetic or optical disk drive, floppy disk drive, flash memory or memory stick. In addition, mass storage 1020 can include storage media separately or in combination with other storage media.

FIG. 10 provides software application(s) 1022 that act as an intermediary between users and/or other computers and the basic computer resources described in suitable operating environment 1000. Such software application(s) 1022 include one or both of system and application software. System software can include an operating system, which can be stored on mass storage 1020, that acts to control and allocate resources of the computer system 1012. Application software takes advantage of the management of resources by system software through program modules and data stored on either or both of system memory 1016 and mass storage 1020.

The computer 1012 also includes one or more interface components 1024 that are communicatively coupled to the bus 1018 and facilitate interaction with the computer 1012. By way of example, the interface component 1024 can be a port (e.g., serial, parallel, PCMCIA, USB, FireWire . . . ) or an interface card (e.g., sound, video, network . . . ) or the like. The interface component 1024 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1012 to output device(s) via interface component 1024. Output devices can include displays (e.g., CRT, LCD, plasma . . . ), speakers, printers and other computers, among other things.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates enhancing real time unified communications, comprising:
   a processing unit containing a processor and memory;
   an interface executing on the processing unit that receives a first portion of data associated with a client application, a modality of a client application, and an environment that hosts a client application;
   an evaluation component executing on the processing unit that collects a second portion of data to build an extensible real time collaboration (RTC) file package, wherein the second portion of data is associated with a client application versioning, wherein the extensible RTC file package incorporates the second portion of data and the first portion of data, and wherein the RTC file package includes a plurality of versions of itself as a plurality of RTC file packages within itself, each included RTC file package having a RTC router supportability cue version, a server authentication ticket, and at least two of an XML version, a server version, and a modality version; and
   a real time collaboration (RTC) component executing on the processing unit that employs the extensible RTC file package to initiate a real time collaboration session with the client application independent of versioning issues of the client application.

2. The system of claim 1, the client application invokes the real time collaboration session with at least one of the following modalities:
   an audio communication, a video communication, a voice over Internet protocol (VoIP) communication, an instant messaging communication, a desktop sharing communication, a modality of collaboration, or a file sharing communication.

3. The system of claim 1, further comprising two or more clients participating in the real time collaboration session independent of each version of client application.

4. The system of claim 3, the RTC file package is specifically tailored for each client and client environment participating in the real time collaboration session.

5. The system of claim 1, wherein the portion of data collected by the evaluation component to build the RTC file package is associated with at least one of a client, the client application, a client application availability, the host environment, and/or an input parameter associated with the client application.

6. The system of claim 5, the portion of data is at least one of an existing client application associated with a client, an environment associated with a client, an operating system, a computer, an input device, a display device, a graphic card, a portion of memory, a processor, a client preference, an available client application listing, a security preference, a digital signature detail, a real time communication setting, a real time collaboration preference, an optimal setting, a versioning associated with a client application, a hardware/software configuration, or an input parameter associated with a particular client application.

7. The system of claim 5, further comprising a build component that generates the RTC file package for a client based at least in part upon the portion of data collected by the evaluation component.

8. The system of claim 1, the RTC component implements the RTC file package to initiate the client application utilizing multipurpose Internet mail Extension (MIME) association, the RTC file package is a browser, communication modality, platform and vendor agnostic file format to implement initiation of real time communication.

9. The system of claim 1, further comprising a signature component that can incorporate a security mechanism into the RTC file package.

10. The system of claim 9, the security mechanism is a signature that authenticates an origin of the RTC file package, the signature ensures the RTC file package correlates to a client.

11. The system of claim 1, further comprising a server that utilizes the RTC file package to implement the real time collaboration session.

12. The system of claim 1, further comprising a browser that utilizes the RTC file package to implement the real time collaboration session.

13. The system of claim 1, further comprising a router that utilizes the RTC file package to route to an appropriate client application for the intended real time collaboration session.

14. The system of claim 1, the RTC file package defines at least one of a password, a ticket, a user name, an AiccSid, a lobby location, a role, a meeting start time, a meeting end time, a meeting identification, a meeting password, a meeting subject, a recording agreement, a uniform resource indicator (URI), a portion of company data, a user name, a user email, or a token to identify at least one of the intended server entity or the intended user entity (client) for the collaboration session.

15. A computer-implemented method that facilitates employing a real time data communication, comprising:
receiving, by a server device, a first portion of data related to a client, a client application, and a client environment;
evaluating, at the server device, at least one of a client, a client application, and a client environment;
evaluating, at the server device, a versioning associated with a client application;
creating, at the server device, a real time collaboration (RTC) file package based at least in part upon the first portion of received data, wherein the RTC file package is built specifically for the client based upon the evaluation, wherein the RTC file package incorporates a second portion of data that is associated with the client application versioning, and wherein the RTC file package includes a plurality of versions of itself as a plurality of RTC file packages within itself, each included RTC file package having a RTC router supportability cue version, a server authentication ticket, and at least two of: an XML version, a server version, and a modality version; and
employing, at the server device, a real time collaboration with the RTC file package, wherein the RTC file package identifies the client application for real time communication and a modality utilized for real time communication.

16. The method of claim 15, the modality for the real time communication is at least one of an audio communication, a video communication, a voice over Internet protocol (VoIP) communication, an instant messaging communication, a desktop sharing communication, or a file sharing communication with a disparate modality of collaboration.

17. The method of claim 15, further comprising:
enabling seamless real time communication between two or more clients utilizing the RTC file package; and
utilizing an extensible, XML based format for the RTC file package that accommodates support for a future modality of collaboration.

18. The method of claim 15, further comprising enabling at least one of a server, a router or a browser to utilize the RTC file package to employ the real time communication.

19. A computer-implemented system that facilitates seamlessly initiating a real time data communication between two or more clients, comprising:
means for receiving a first portion of data associated with at least one of a client application and an environment that hosts a client application;
means for evaluating a client, a client application, and a client environment;
means for evaluating a versioning associated with a client application;
means for incorporating the first portion of data into real time collaboration (RTC) file package, wherein the RTC file package is built specifically for the client based upon the evaluation, wherein the RTC file package incorporates a second portion of data that is associated with the client application versioning, and wherein the RTC file package includes a plurality of versions of itself as a plurality of RTC file packages within itself, each included RTC file package having a RTC router supportability cue version, a server authentication ticket, and at least two of an XML version, a server version, and a modality version; and
means for employing the RTC file package to initiate a real time collaboration session with the client application.

* * * * *